Patented Nov. 8, 1932

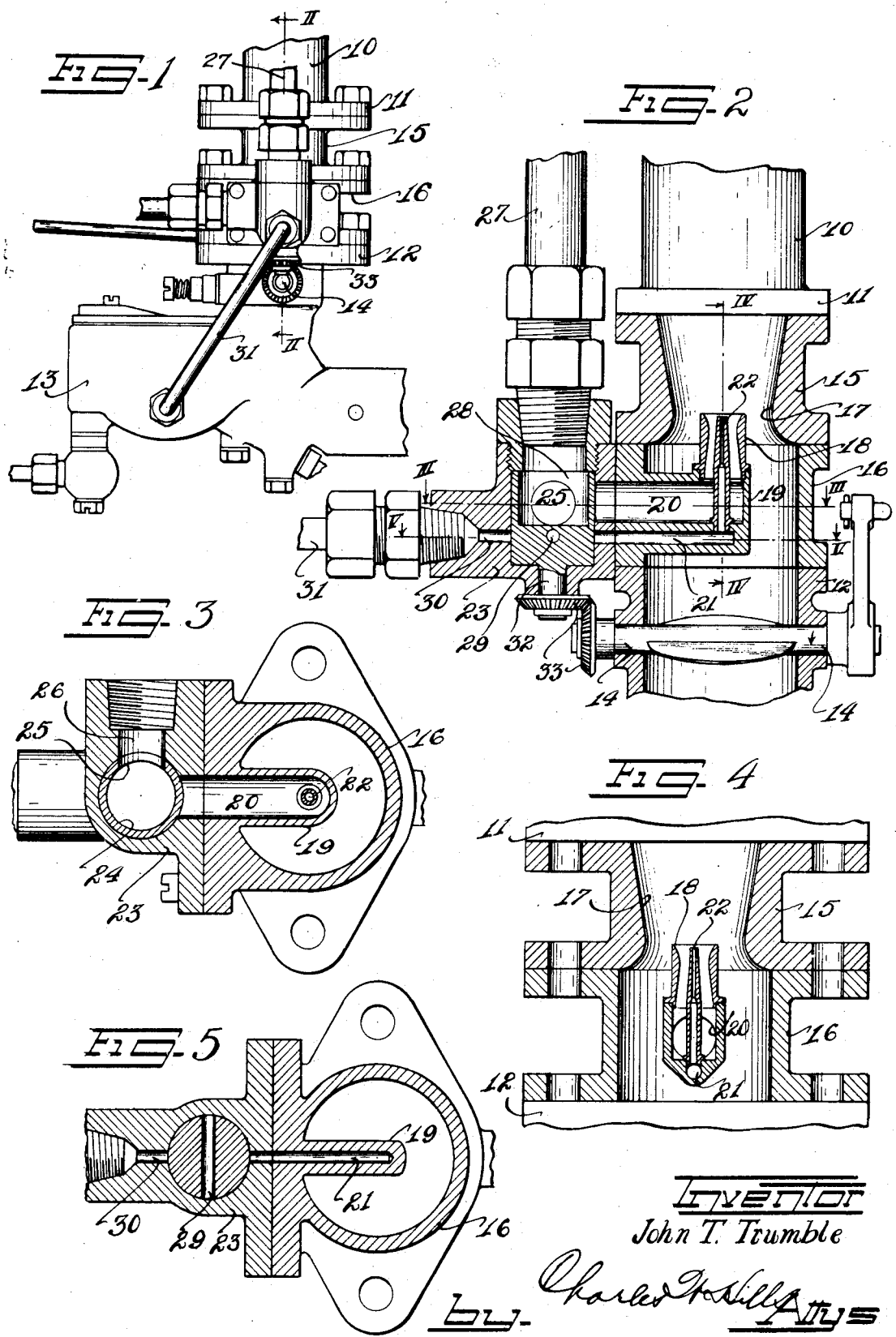

1,886,989

UNITED STATES PATENT OFFICE

JOHN T. TRUMBLE, OF LANSING, MICHIGAN

SUPERCHARGING APPARATUS

Application filed August 29, 1928. Serial No. 302,741.

This invention relates to supercharging internal combustion engines and has particular reference to so supercharging carburetion type engines as to increase the performance range and power thereof with a minimum expenditure of energy for the supercharging mechanism.

Heretofore supercharging systems have been proposed untilizing various forms of centrifugal and rotary displacement blowers handling the entire charge of air entering the intake system of an engine. Such superchargers have been placed either before the carburetor or between the carburetor and the engine. In either case the superchargers have had to handle a large volume of air at low pressure, resulting either in a very large slow speed compressor or in very high rotative speeds in the neighborhood of 35,000 R. P. M. and up in the case of centrifugal compressors. In tests on a Liberty engine such compressors have absorbed in the neighborhood of 50 horsepower.

It is therefore an object of this invention to provide means for introducing a small volume of auxiliary air under pressure into the normal carburetion or induction system of an engine by means of an injector in the engine intake, such an injector acting to accelerate the flow of fuel and air mixture in the normal intake system, thus increasing the volumetric efficiency of the engine at all speeds at which supercharging is desired, but especially at high speed when the volumetric efficiency of an engine drops rapidly if the engine is designed for satisfactory performance at low speeds.

I have found that except at extreme high speeds the normal carburetion system can supply sufficient fuel to operate with the dilution caused by the auxiliary supercharging air; but that under wide open operating conditions with the addition of supercharging air it is necessary to supply additional fuel. It is accordingly another object of this invention to incorporate a fuel supply nozzle in the injector in order to directly carburet the auxiliary air under wide open operating conditions.

It is also an object of this invention to provide regulating means whereby the supercharging air can be controlled in accordance with the demand on the engine. I have found it to be desirable to have the supcharging air control operate in step with the normal carburetor control in order that under idling conditions the supercharger will not unduly thin out the normal mixture supply. As a corollary of this object I provide the regulating means with a fuel supply control opened only when the supercharge regulating means is nearly wide open.

Other and further important objects of this invention will be apparent from the disclosures in the specification and the accompanying drawing.

This invention (in a preferred form) is illustrated in the drawing and hereinafter more fully described.

On the drawing:

Figure 1 is an elevation of a device embodying the features of this invention as installed between a carburetor and a fragmentary portion of an intake manifold.

Figure 2 is an enlarged sectional view taken on line II—II of Figure 1.

Figure 3 is a sectional view taken on line III—III of Figure 2.

Figure 4 is a sectional view taken on line IV—IV of Figure 2.

Figure 5 is a sectional view taken on line V—V of Figure 2.

As shown:—An intake manifold 10 terminates in a mounting flange 11 to which a carburetor flange 12 is normally bolted, the carburetor chosen for illustration being shown in elevation as only the float chamber or bowl 13 and throttle shaft 14 need specific reference herein. The device of this invention is in the form of adapters 15 and 16 intended to be inserted between the flanges 11 and 12 thus lowering the carburetor relative to the intake manifold.

The upper adapter 15 is simply a short double flanged section externally similar to the intake manifold and formed with a Venturi shaped interior passage 17. The lower adapter 16 is formed as a spacer to support an air injector nozzle 18 projecting upwardly into the Venturi passage 17, the nozzle 18 being supported on a horizontal boss 19 passaged at 20 to convey air to the nozzle. The boss 19 is also passaged at 21 for a fuel lead to a central fuel nozzle 22 within the air nozzle.

Bolted to the side of the adapter 16 is a valve casing 23 housing a rotatable cylindrical valve 24 having a port 25 in its wall adapted in one position of the valve to register with the air passage 20, and in another position to register with a relief or bypass passage 26 which may be piped back to the supercharger inlet or disposed of in any suitable way. The compressed air inlet from the supercharger (not shown) is through the pipe 27 and axially into the interior 28 of the cylindrical valve.

The valve is also provided with a cross passage 29 adapted, when the port 25 fully registers with the passage 20, to also register with the fuel passage 21. Fuel is supplied to the passage 29 through a passage 30 and pipe 31 connected to the float chamber 13 of the carburetor.

The valve 24 is provided with a projecting stem 32 having a bevel gear 33 thereon engaging a similar gear on the throttle shaft 14 so that as the throttle is opened the valve is likewise rotated to bring the port 25 into register with the passage 20. This normal idling position of the throttle valve 14 is shown in Figure 2 and the valve 24 is so adjusted that the port 25 then registers with the relief or bypass passage 26.

*The operation:*—An engine to which a supercharging injector has been applied is capable of operating in the normal manner with the injector cut off. With a supercharger supplying air under about ten pounds pressure to the injector the engine may be idled or operated under light load without the injection of auxiliary air, this compressed air being vented through the port 26. As the throttle is gradually opened the valve 24 is rotated to bring the port 25 in the valve into increasing register with the injector air passage 20. The compressed air entering the injector nozzle acts in a well known manner to increase and speed up the flow of fuel and air mixture in the manifold. With a full opening of the valve 24 and throttle a maximum manifold velocity of a thousand feet per second can be obtained, several times the velocity normally attainable in an intake manifold at full throttle and high engine speed. At partial throttle openings a marked increase of vehicle speed can be noted when the injector is brought into action. When a test vehicle was running on the level with the throttle set for 15 M. P. H. and the compressed air turned into the nozzle an increase of speed of about 12 M. P. H. was obtained with the same carburetor throttle setting.

When the carburetor throttle is substantially wide open the valve 24 will be rotated sufficiently to bring the fuel passage 29 therein into register with the passages 30 and 21 the air nozzle then acting as an injector or auxiliary plain tube carburetor to mix fuel with the supercharging air.

In applying this supercharging system to existing cars it has been found unnecessary to change the carburetor adjustments so that the auxiliary air supply, at speeds below that at which fuel is supplied thereto, serves to thin or dilute the mixture with a consequent increase in fuel mileage.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A supercharger connection for internal combustion engines comprising a Venturi member positioned between the carburetor and intake manifold of the engine, an injector nozzle therein, passaged means leading to said nozzle and adapted to receive the discharge from said supercharger, a separate fuel passage from said carburetor to said nozzle and a valve controlling said discharge and said fuel passage.

2. In combination with the intake system of an internal combustion engine a supercharger connection thereto comprising a connection from a source of air under pressure, an injector nozzle connected thereto and projecting into said intake system whereby the air under pressure is adapted to accelerate the flow of the gases in said intake system, a fuel passage leading to said injection nozzle and a valve adapted to control both said connection and fuel passage.

3. In combination with the intake system of an internal combustion engine a supercharger connection thereto comprising a connection from a source of air under pressure, an injector nozzle connected thereto and projecting into said intake system whereby the air under pressure is adapted to accelerate the flow of the gases in said intake system, a fuel passage leading to said injection nozzle, a valve adapted to control both said connection and fuel passage and means for operating said valve from the normal regulating mechanism for the intake system.

4. In combination with an internal combustion engine and the carburetion system thereof, means for introducing an auxiliary supply of air under pressure to said system comprising an injector adapted to accelerate the flow in said carburetion system, means for supplying additional fuel at said nozzle when said regulating means is wide open, means for simultaneously regulating said air supply and said fuel supply and means linking said regulating means to the throttle control of said carburetor.

5. In combination with the intake system of an internal combustion engine, a supercharger connection thereto comprising an injection nozzle projecting into the intake system to accelerate the normal flow of fuel and air mixture in said intake system, means for supplying additional fuel to the intake system to compensate for the supercharge introduced therein, and a valve for controlling both the supercharger connection and the means for supplying additional fuel.

In testimony whereof I have hereunto subscribed my name at Lansing, Ingham County, Michigan.

JOHN T. TRUMBLE.